United States Patent [19]

Hockemeyer et al.

[11] Patent Number: 4,571,349

[45] Date of Patent: Feb. 18, 1986

[54] CROSSLINKABLE ORGANOPOLYSILOXANES AND A METHOD FOR PREPARING THE SAME

[75] Inventors: Friedrich Hockemeyer, Griesbach; Peter John, Burghausen; Johann Müller, Burghausen; Gerhard Preiner, Burghausen, all of Fed. Rep. of Germany

[73] Assignee: Wacker-Chemie GmbH, Munich, Fed. Rep. of Germany

[21] Appl. No.: 687,397

[22] Filed: Dec. 28, 1984

[30] Foreign Application Priority Data

Jan. 24, 1984 [DE] Fed. Rep. of Germany ....... 3402317

[51] Int. Cl.$^4$ .............................................. B05D 3/06
[52] U.S. Cl. .................................. 427/54.1; 427/35; 522/1; 528/30; 528/32; 428/447
[58] Field of Search ............... 528/30, 32; 204/159.13; 427/35, 54.1; 428/447

[56] References Cited

U.S. PATENT DOCUMENTS 4,290,869  9/1981  Pigeon .................................. 528/17
4,359,369  11/1982  Takamizawa et al. ............... 528/30

Primary Examiner—Melvyn I. Marquis

[57] ABSTRACT

Organopolysiloxanes which are crosslinked by high energy radiation consisting essentially of siloxane units of the formulas:

(a) $HR^1C=CR^2COOR^3SiR_2O_{\frac{1}{2}}$,
(b) $HSR^4SiRO$ and
(c) $R_2^5SiO$ where R is a monovalent hydrocarbon radical or a halogenated monovalent hydrocarbon radical, $R^1$ is hydrogen or a phenyl radical or a halogenated phenyl radical, $R^2$ is hydrogen or an alkyl radical having from 1 to 4 carbon atoms per radical and $R^3$ is a hydrocarbon radical or a halogenated hydrocarbon radical, $R^4$ is a divalent hydrocarbon radical, $R^5$ is the same as R or a hydrocarbon radical substituted with the $HR^1C=CR^2COO$ group, where $R^1$ and $R^2$ are the same as above, in which two siloxane units of the formula

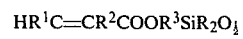

are present per molecule. These organopolysiloxanes are prepared by equilibrating the corresponding siloxanes in accordance with the conventional methods known in the art.

These organopolysiloxanes can be crosslinked by high energy radiation, for example, ultraviolet radiation, to form coatings on paper for releasing tacky substances or as coatings on optic fibers and as photocuring sealants for electronic components.

9 Claims, No Drawings

CROSSLINKABLE ORGANOPOLYSILOXANES AND A METHOD FOR PREPARING THE SAME

The present invention relates to crosslinkable organopolysiloxanes, particularly to organopolysiloxanes which may be crosslinked with high energy radiation and more particularly to a method for preparing organopolysiloxanes which may be crosslinked by radiation.

BACKGROUND OF THE INVENTION

Photopolymerizable organopolysiloxane compositions containing SiC-bonded acryloxyalkyl or methacryloxy groups and mercaptoalkyl groups are described in U.S. Pat. No. 4,290,869 to Pigeon. These compositions are stable in closed and opaque containers, for about 48 hours. (See column 8, lines 36 to 38).

Photopolymerizable organopolysiloxane compositions containing SiC-bonded thioacryloxyalkyl and mercaptoalkyl groups are also described in U.S. Pat. No. 4,359,369 to Takamizawa et al.

The organopolysiloxanes of this invention differ from the organopolysiloxanes described in U.S. Pat. No. 4,290,869 in that they are substantially free of SiOC-bonded organic radicals. It is believed that this contributes to the better storage stability of the organopolysiloxanes of this invention. Furthermore, it is surprising that the organopolysiloxanes of this invention rapidly crosslink when exposed to high-energy radiation in the absence of the SiOC-bonded organic radicals.

Therefore, it is an object of the present invention to prepare readily available organopolysiloxanes which can be stored for at least 6 months in closed and opaque containers at ambient temperature. Another object of the present invention is to provide organopolysiloxanes which do not emit an unpleasant odor. Still another object of the present invention is to provide organopolysiloxanes which rapidly crosslink when exposed to high energy radiation. Still another object of the present invention is to provide organopolysiloxanes which readily crosslink in the presence of atmospheric oxygen when exposed to high energy radiation without noticeable post-crosslinking. A further object of the present invention is to provide organopolysiloxanes in which the "release-value" of the coatings either prior to or after crosslinking remains essentially the same over a long-term storage period. A still further object of this invention is to provide crosslinked organopolysiloxane coatings which are very transparent, flexible and abrasion-resistant.

SUMMARY OF THE INVENTION

The foregoing objects and others which will become apparent from the following description are accomplished in accordance with this invention, generally speaking, by providing an organopolysiloxane in which at least 95 mol percent of the siloxane units have units of the formulas:
(a) $HR^1C\!=\!CR^2COOR^3SiR_2O_{\frac{1}{2}}$,
(b) $HSR^4SiRO$ and
(c) $R_2^5SiO$,
wherein R is a monovalent hydrocarbon radical or a halogenated monovalent hydrocarbon radical, $R^1$ is hydrogen or a phenyl radical or a halogenated phenyl radical, $R^2$ is hydrogen or an alkyl radical having from 1 to 4 carbon atoms per radical, $R^3$ is a divalent hydrocarbon radical or a halogenated divalent hydrocarbon radical, $R^4$ is a divalent hydrocarbon radical, $R^5$ is the same as R or a hydrocarbon radical substituted with the $HR^1C\!=\!CR^2COO$ group, where $R^1$ and $R^2$ are the same as above, in which two siloxane units of the formula $HR^1C\!=\!COOR^3SiR_2O_{\frac{1}{2}}$ are present per molecule and at least 95 percent of the Si-bonded oxygen atoms in the siloxane units containing the HS group are present in the $\equiv\!SiOSi\!\equiv$ grouping.

These organopolysiloxanes are prepared by equilibrating the corresponding organopolysiloxanes in accordance with conventional methods described in the art.

DETAILED DESCRIPTION OF THE INVENTION

In the above formulas, the hydrocarbon radicals represented by R and $R^5$ may be alkyl radicals which contain from 1 to 18 carbon atoms per radical, such as the methyl, ethyl, n-propyl, isopropyl, n-butyl and sec-butyl radicals as well as the octadecyl radicals; cycloalkyl radicals containing from 5 to 8 carbon atoms per radical, such as the cyclohexyl and cycloheptyl radicals as well as the methylcyclohexyl radicals; alkenyl radicals which contain aliphatic carbon-carbon double bonds and have from 2 to 18 carbon atoms per radical, such as the vinyl and allyl radicals; aryl radicals containing from 6 to 12 carbon atoms per radical such as the phenyl radical and xenyl radicals; alkaryl radicals containing from 7 to 18 carbon atoms per radical, such as the tolyl radicals and aralkyl radicals containing 7 to 18 carbon atoms per radical, such as the benzyl and B-phenylethyl radicals.

Examples of halogen-substituted hydrocarbon radicals represented by R and $R^5$ are 3-chloropropyl and 3,3,3-trifluoropropyl radicals and o-, p- and m-chlorophenyl radicals.

Examples of halogenated phenyl radicals represented by $R^1$ are o-, m- and p-chlorophenyl radicals. Preferably $R^1$ is hydrogen.

Examples of alkyl radicals represented by $R^2$ are methyl, ethyl, propyl and butyl radicals, with methyl being the preferred alkyl radical. Preferably, however, $R^2$ is hydrogen.

The radical represented by $R^3$ is preferably a radical of the formula $-(CH_2)_p-$ wherein p is a whole number with a value of from 1 to 6, preferably from 2 to 6 and more preferably 3. The radical represented by $R^3$ may also be a branched alkylene radical, such as a radical of the formula $-CH_2C(CH_3)_2CH_2-$, an arylene radical such as the phenylene radical, an alkarylene radical having the general formula $-(CH_2)_2C_6H_4-$ or an aralkylene radical such as the toluylene radical. Examples of halogen substituted $R^3$ radicals are o-, p- and m-chlorophenylene radicals.

The examples of hydrocarbon radicals represented by $R^3$ also apply to the $R^4$ radicals, wherein the radical having the formula $-(CH_2)_3-$ is again preferred due to its availability.

Other examples of radicals represented by $R^4$ are those having the formulas

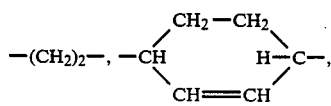

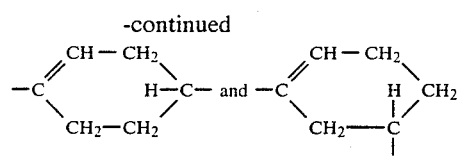

The most important example of the HR$^1$C=CR$^2$COO group-substituted hydrocarbon radical represented by R$^5$ is a radical having the general formula:

HC$_2$=CHCOO(CH$_2$)$_3$-.

Preferably, however, at least 95 percent of the number of R and R$^5$ radicals are methyl radicals.

Preferably the organopolysiloxanes of this invention contain from 1 to 30, and more preferably from 2 to 10 units of the general formula:

HSR$^4$SiRO and from 10 to 1000 and more preferably from 50 to 300 units of general formula:

R$_2^5$SiO per molecule.

The ratio of siloxane units having the general formula: HSR$^4$SiO to units having the formula R$_2^5$SiO is preferably from 1:1000 to 1:1 and more preferably from 1:100 to 1:30.

The preferred organopolysiloxanes of this invention may be represented by the following general formula:

H$_2$C=CHCOO(CH$_2$)$_p$SiR$_2$O{SiR[(CH$_2$)$_3$SH]O}$_m$-(SiR$_2^5$O)$_n$SiR$_2$(CH$_2$)$_p$OOCHC=CH$_2$ wherein R, R$^5$ and p are the same as above, m is a whole number having a value from 1 to 30 and more preferably from 2 to 10, n is a whole number having a value from 10 to 1000 and more preferably from 50 to 300 and the ratio of m:n is 1:1000 to 1:1 and more preferably from 1:100 to 1:30.

Although this is not shown in the above formula, up to 5 mol percent of other siloxane units may be present in addition to the siloxane units indicated above; however, these siloxane units are more or less impurities which are difficult to remove. Examples of such other siloxane units are those of the formula RSiO$_{3/2}$ and SiO$_{4/2}$, where R is the same as above.

The organopolysiloxanes of this invention are prepared by equilibrating organo(poly)siloxanes of the general formula:

CH$_2$=CHCOO(CH$_2$)$_p$SiR$_2$O(SiR$_2^5$O)$_x$SiR$_2$(CH$_2$)$_p$OOCHC=CH$_2$, where R, R$^5$ and p are the same as above and x is 0 or a whole number having a value from 1 to 1000 with linear organo(poly)siloxanes having the general formula:

HO{SiR[(CH$_2$)$_3$SH]O}$_m$(R$_2^5$O)$_x$H, where R$^5$, m and x are the same as above or cyclic organopolysiloxanes having units of the general formula:

SiR[(CH$_2$)$_3$SH]O and possibly with units of the general formula:

SiR$_2^5$O where R and R$^5$ are the same as above and each molecule of the cyclic organopolysiloxane contains a total of from 3 to 6 siloxane units, and if appropriate linear or cyclic organo(poly)siloxanes having the general formula:

HO(SiR$_2^5$O)$_n$H or (SiR$_2^5$O)$_q$ where R$^5$ and n are the same as above and q is a whole number with a value from 3 to 6.

In preparing the organopolysiloxanes of this invention, the reactants are used in amounts of from 0.5 to 15 HS groups and preferably 1 to 5 HS groups per acryloxy group.

The number of R$_2^5$O units in the reactants corresponds to the desired ratio of m to n in the resultant product.

The organopolysiloxanes prepared in accordance with this invention preferably have a viscostiy of from 50 to 10,000 mPa.s at 25° C.

Acid catalysts are preferably used as catalysts in the equilibration reaction. Examples of such catalysts are sulfuric acid, phosphoric acid, trifluoromethanesulfonic acid and phosphonitrile chlorides and acid catalysts which are solid under the reaction conditions such as acid-activated bleaching earths, acid zeolites, sulfonated carbon and sulfonated styrene-divinylbenzene copolymers with phosphonitrile chlorides being the preferred catalysts. The phosphonitrile chlorides are preferably used in an amount of from 5 to 1000 ppm by weight (ppm=parts per million) and more preferably from 50 to 200 ppm by weight, based on the total weight of the organosilicon compounds used.

The equilibration mixture may be heated to a temperature of from about 70° C. to about 150° C. in order to accelerate the equilibration reaction. The equilibration reaction is preferably carried out in a 5 to 20 percent by weight, based on the total weight of the organosilicon compounds, of a water-immiscible solvent such as toluene in order to prevent premature crosslinking of the reaction product and to facilitate removal of water formed during the reaction.

Generally, the equilibration is preferably carried out under ambient pressure, that is, at about 1020 mbar (abs.) or approximately 1020 mbar (abs.). However, higher or lower pressures may also be used, if desired.

When the equilibration reaction is complete, the catalyst can be rendered inactive, for example, by the addition of trioctylamine or triisononylamine.

The organopolysiloxanes prepared in accordance with this invention can be applied as coatings and then crosslinked by high energy radiation.

Coatings prepared from the organopolysiloxanes of this invention are repellent with respect to tacky substances and water. They are also suitable as protective coatings.

The organopolysiloxanes of this invention can be applied on surfaces, such as, for example, ceramic objects or glass, including glass fibers such as optic fibers; paper such as kraft paper or parchment paper; cardboard as well as asbestos, cellophane, wood and cork; plastic films, for example, polyethylene films or polypropylene films; woven or non-woven fabric made of natural fibers, synthetic organic fibers or glass fibers; metals such as aluminum foil; kraft paper coated with polyethylene or cardboard coated with polyethylene in which the polyethylene may be high-, medium- or low-pressure polyethylene. The organopolysiloxanes of this invention form coatings which are excellent, for example, as carriers for adhesive labels.

The organopolysiloxanes of this invention can be applied to surfaces to be coated in any manner known for preparing coatings of fluid substances, such as for example, by immersion, painting, casting, spraying, rolling, printing, for example, by an offset gravure coating apparatus, knife or doctor blade coating, including a Meyer rod, or by an air brush. When the organopolysiloxanes are applied using an offset gravure coating apparatus, the substrate with the surface to be coated can be run at a higher velocity than the form cylinder.

The organopolysiloxanes of this invention can be applied to a surface to be coated, as a solution or as an emulsion. Preferably, however, no solvents or other diluents are used.

The organopolysiloxanes of this invention crosslink in a relatively short period of time when exposed to high energy radiation even when they are present as a layer which is more than 5 mm in thickness. Because of their transparency, the organopolysiloxanes are excellent sealing compounds for electrical or electronic components.

The high energy radiation used to crosslink the organopolysiloxanes of this invention is preferably ultraviolet radiation. However, the high energy radiation may also be X-rays, gamma rays or electron beams, for example, or the simultaneous use of at least two different types of such radiation. In addition to high energy radiation, a thermal source, including infrared radiation, can be used; however, such a thermal source is not required and is preferably omitted in order to reduce the energy expenditure.

When electron beams are used as the radiation source, generally from 1 to 4 Mrad are sufficient.

If ultraviolet radiation is employed, then wavelengths in the range of from 200 to 400 nm (nanometers) are preferred.

When ultraviolet radiation is used for crosslinking the organopolysiloxanes of this invention, then at least one photosensitizer must e present in the organopolysiloxanes. Preferred photosensitizers are photosensitizers which are soluble in the organopolysiloxanes such as 2-hydroxy-2-methyl-1-phenylpropan-1-one and 2,4-bis(-trimethylsiloxy)benzophenone. Other examples of suitable photosensitizers are benzophenone and substituted benzophenones, benzoin and substituted benzoins and benzil and substituted benzil. Specific examples of photosensitizers are acetophenone, 2-ethoxy-2-methylacetophenone, trichlorobutylacetophenone, 2-ethoxy-2-phenylacetophenone, mesityl oxide, propiophenone, benzophenone, xanthone, thioxanthone, fluorenone, benzaldehyde, fluorene, anthraquinone, carbazole, 3-methylacetophenone, 4-methylacetophenone, 3-bromoacetophenone, 4-methylbenzophenone, 4-chlorobenzophenone, 4,4-dimethoxybenzophenone, 4-chloro-4'-benzylbenzophenone, 3-chloroxanthone, 3,9-dichloroxanthone, 3-chloro-8-nonylxanthone, chloroanthraquinone, Michler's ketone, cinnamic acid, benzoin methyl ether, disodium anthraquinone-1,5-disulfonate, 2-naphthalenesulfonyl chloride, benzil ketals and hydroxybenzophenones.

Generally, the amount of photosensizer present in the organopolysiloxanes of this invention may range from about 0.5 to 2 weight percent based on the weight of the organopolysiloxanes.

In addition to the organopolysiloxanes and photosensitizers, other substances can be used in the coating compositions of this invention. Examples of such other substances are, in particular, agents which improve the adhesion to the substrate of the crosslinked organopolysiloxanes, such as butanediol diacrylic acid esters and γ-glycidoxypropyltriacetoxysilane.

In the following examples, all percentages are by weight unless otherwise specified.

EXAMPLE 1

A mixture containing 410.4 g of a mixed hydrolyzate consisting of 29 mols of silane of the formula $(CH_3)_2SiCl_2$ and 1 mol of silane of the formula $CH_3[HS(CH_2)_3]Si(OCH_3)_2$ which contains an Si-bonded hydroxyl group in each terminal unit, 60 g of an organopolysiloxane having the formula $H_2C=CHCOO(CH_2)_3Si(CH_3)_2[Si(CH_3)_2O]_9-$
$Si(CH_3)_2(CH_2)_3OOCHC=CH_2,$ 444 g of dimethylpolysiloxane which has an Si-bonded hydroxyl group in each terminal unit and containing an average of 100 Si atoms per molecule and 150 g of toluene is mixed with 0.36 ml of a 25 percent solution of phosphonitrile chlorides in methylene chloride and heated for 2 hours at reflux temperature. The water formed during the reaction is removed using a Dean-Stark trap. The catalyst is then rendered inactive with 0.5 g triisononylamine and the solution is filtered with the aid of activated carbon and diatomaceous earth. The solvent and lower molecular weight products are distilled off at 80° C. and at 100 Pa (abs.). The clear, colorless oil obtained in a yield of 825 g (90 percent of theory) has a viscosity of 800 mPa.s at 25° C. On the basis of a nuclear magnetic resonance spectrum, it contains an average of 230 dimethylsiloxane units and 3.8 $CH_3[HS(CH_2)_3]SiO$ units per molecule. The organopolysiloxane product can be stored in a closed, opaque container at ambient temperature for at least 6 months.

EXAMPLE 2

A sample of the organopolysiloxane product prepared in accordance with Example 1 is mixed with 1 percent of 2-hydroxy-2-methyl-1-phenylpropane-1-one and 0.8 percent of butanediol diacrylate and applied with a glass rod on kraft paper finished with a steam calender. Upon illumination with a medium-pressure ultraviolet mercury lamp (output of 80 watt/cm luminous length and a maximum output at 366 nm) at a distance of 10 cm from the surface of the coated paper; the mixture is crosslinked within 0.3 seconds to form a glossy, abrasion-resistant coating.

The release properties and residual adhesive strength are determined according to FINAT 10 and 11, in "Suppliers and Users Technical Manual," June, 1980, pages 21 to 24, using a commercial pressure-sensitive 2-cm wide adhesive strip ("Tesafilm Red No. 154," Beiersdorf AG, Hamburg, West Germany, "Tesa" is a registered trademark). The results are as follows:
Release value: 5.0 mN/mm
Residual adhesive strength: 74 percent.

EXAMPLE 3

Another sample of the organopolysiloxane prepared in accordance with Example 1 is mixed with 1.5 percent γ-glycidoxypropyltriacetoxysilane and applied with a glass rod on coated kraft paper. The mixture applied on the paper is crosslinked within 0.1 seconds when exposed to an electron beam unit at 3 Mrad to form a glossy, abrasion-resistant coating.

The release value and residual adhesive strength is determined in accordance with the procedure described in Example 2. The results are as follows:
Release value: 4.9 mN/mm
Residual adhesive strength: 100 percent.

What is claimed is:

1. Organopolysiloxanes in which at least 95 mol percent of the siloxane units consist of units of the formulas:
(a) $HR^1C=CR^2COOR^3SiR_2O_{\frac{1}{2}}$
(b) $HSR^4SiRO$ and
(c) $R_2^5SiO$
where R is selected from the group consisting of a monovalent hydrocarbon radical and a halogenated monovalent hydrocarbon radical, $R^1$ is selected from the group consisting of hydrogen, a phenyl radical and a halogenated phenyl radical, $R^2$ is selected from the group consisting of hydrogen and an alkyl radical containing from 1 to 4 carbon atoms per radical, $R^3$ is selected from the group consisting of a divalent hydrocarbon radical and a halogenated divalent hydrocarbon radical, $R^4$ is a divalent hydrocarbon radical, $R^5$ is selected from the group consisting of R and a hydrocarbon radical substituted with the $HR^1C=CR^2COO$ group, where $R^1$ and $R^2$ are the same as above, in which two siloxane units of the formula $HR^1C=CR^2COOR^3SiR_2O_{\frac{1}{2}}$ are present per molecule and at least 95 percent of the Si-bonded oxygen atoms present in the siloxane units having the HS group are present in the $\equiv SiOSi\equiv$ grouping.

2. The organopolysiloxanes of claim 1, wherein the organopolysiloxanes have the formula $$H_2C=CHCOO(CH_2)_pSiR_2O\{SiR[(CH_2)_3SH]O\}_m(SiR_2^5O)_nSiR_2(CH_2)_pOOCHC=CH_2$$

in which R is selected from the group consisting of a monovalent hydrocarbon radical and a halogenated monovalent hydrocarbon radical, $R^5$ is selected from the group consisting of R and a hydrocarbon radical substituted with the $HR^1C=CR^2COO$ group, where $R^1$ is selected from the group consisting of hydrogen, a phenyl radical and a halogenated phenyl radical $R^2$ is selected from the group consisting of hydrogen and an alkyl radical containing from 1 to 4 carbon atoms per radical, m is a whole number having a value of from 1 to 30, n is a whole number having a value of from 10 to 1000 and p is a whole number having a value of from 1 to 6.

3. A method for coating a substrate which comprises applying the organopolysiloxanes of claim 1 to a substrate and thereafter exposing the coated substrate to high energy radiation to form an abrasion resistant coating thereon.

4. A method for coating a substrate which comprises applying the organopolysiloxanes of claim 2 to the substrate and thereafter exposing the coated substrate to high energy radiation to form an abrasion resistant coating thereon.

5. The method of claim 3 wherein the substrate is paper.

6. The method of claim 4, wherein the substrate is paper.

7. The coated substrate obtained from the method of claim 3.

8. A method for preparing the organopolysiloxanes of claim 2, which comprises equilibrating an organo(poly)siloxane having the formula:

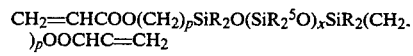

in which R is selected from the group consisting of a monovalent hydrocarbon radical and a halogenated monovalent hydrocarbon radical, $R^5$ is selected from the group consisting of R and a hydrocarbon radical substituted with the $HR^1C=CR^2COO$ group, $R^1$ is selected from the group consisting of hydrogen, a phenyl radical and a halogenated phenyl radical, $R^2$ is selected from the group consisting of hydrogen and an alkyl radical containing from 1 to 4 carbon atoms per radical, p is a whole number having a value of from 1 to 6 and x is 0 or a whole number having a value of from 1 to 1000 with a siloxane selected from the group consisting of (i) a linear organo(poly)siloxane having the formula:

$$HO\{SiR[(CH_2)_3SH]O\}_m(R_2^5O)_xH,$$

(ii) a cyclic organopolysiloxane having units of the formula $SiR[(CH_2)_3SH]O$ and mixtures thereof with the priviso that the cyclic organopolysiloxane may contain units of the formula $$SiR_2^5O,$$

in which the total number of siloxane units in such a cyclic organopolysiloxane is from 3 to 6 per molecule, in which R and $R^5$ are the same as above, m is a whole number having a value of from 1 to 30, and x is the same as above in the presence of an acid catalyst and at a temperature of from about 70° C. to about 150° C.

9. The process of claim 8, wherein a siloxane selected from the group consisting of a linear organo(poly)siloxane having the formula $$HO(SiR_2^5O)_nH,$$

a cyclic organo(poly)siloxane of the formula $$(SiR_2^5O)_q$$

and mixtures thereof is present in the equilibration reaction, wherein $R^5$ is selected from the group consisting of R and a hydrocarbon radical substituted with the $HR^1C=CR^2COO$ group, $R^1$ is selected from the group consisting of hydrogen, a phenyl radical and a halogenated phenyl radical, $R^2$ is selected from the group consisting of hydrogen and an alkyl radical containing from 1 to 4 carbon atoms per radical, n is a whole number having a value of from 10 to 1000 and q is a whole number having a value of from 3 to 6.

* * * * *